Dec. 28, 1926.
C. G. CLEMENT
REVERSIBLE TRAILER
Filed Sept. 12, 1925
1,611,889
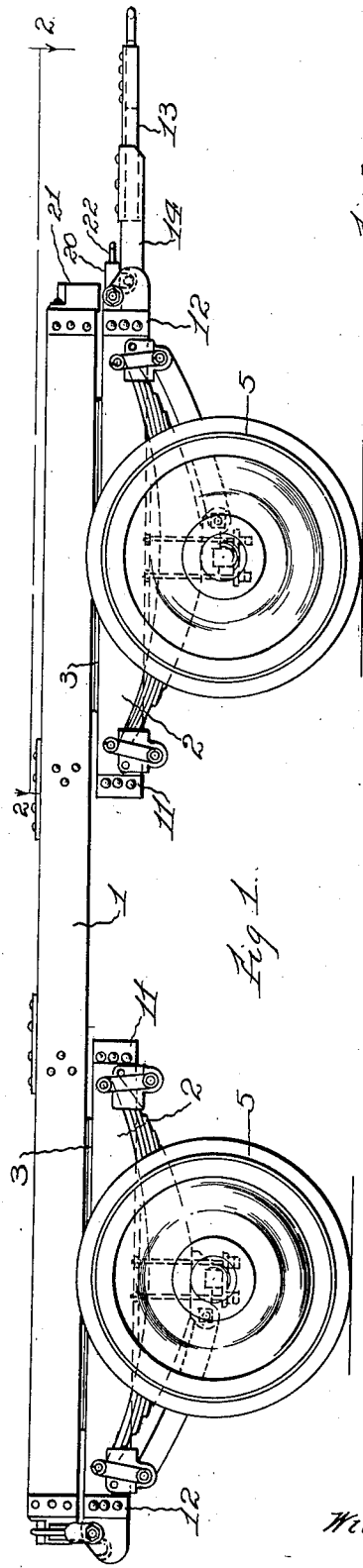
Inventor.
Charles G. Clement.
by Burton & Burton
Attorneys.
Witness.
H. T. McKnight.

Patented Dec. 28, 1926.

1,611,889

UNITED STATES PATENT OFFICE.

CHARLES G. CLEMENT, OF EDGERTON, WISCONSIN, ASSIGNOR TO HIGHWAY TRAILER COMPANY, OF EDGERTON, WISCONSIN, A CORPORATION OF WISCONSIN.

REVERSIBLE TRAILER.

Application filed September 12, 1925. Serial No. 55,899.

This invention relates to a trailer vehicle of the reversible type in which wheels at both ends of the frame are dirigibly mounted by the pivoting of the axle upon a turn table. The purpose of the invention is to provide means to ensure locking one or the other of the turn tables at the end of the vehicle which is the rear end, for the time being. It consists of certain features and elements of construction in combination as herein shown and described, and as indicated by the claims.

In the drawings:—

Figure 1 is a side elevation of a trailer embodying this invention.

Figure 2 is a top plan view of one end of the trailer frame with its draw bar in position for use.

Figure 3 is an enlarged detail view of the locking mechanism at one end.

Figure 4 is an elevation of the parts shown in Figure 3.

Figure 5 is a detail elevation of the lock-operating handle.

In a vehicle of this type in which both axles are mounted on turn tables for alternative use in steering the vehicle, it is necessary to guard against the possibility having both turn tables free for swiveling movement at the same time, since this would permit the two axles to be swung into alignment with each other or approximately so, whereupon the frame and its load would tip over by pivoting about the axles. It is always the intention to lock the rear wheels against steering movement while allowing the front wheels to swivel upon their turn table in response to the angular swing of a laterally rigid draw bar connected to the tractor vehicle. By the present invention I inter-connect the turn table lock with means for securing the draw bar in operative position at one end or the other of the vehicle, so that to remove the draw bar it becomes necessary to lock the turn table, and in inserting the draw bar the turn table to which it is attached is automatically unlocked.

Referring to the drawings, the main frame of the vehicle as shown at 1, supported on the substantially square sub-frames, 2, at each end, which are swivelly connected to the main frame by the turn tables, 3. Thus the axles, 4, with their road wheels, 5, being attached to the sub-frames, 2, by the usual vehicle springs are swiveled about the king bolts, 6, of the turn tables, 3. Each of the bolts, 6, is engaged in a plate, 7, anchored to longitudinal members, 8, 8, of the frame, which, in turn, are attached at their ends to a cross member, 9, and the end member, 10, of the frame. Each of the sub-frames includes cross members, 11 and 12, disposed respectively below the parts, 9 and 10, of the main frame and with their outer faces disposed in substantially the same vertical planes when the sub-frames are registered with the main frame in straight-ahead position.

The draw bar, 13, is branched rearwardly at 14 to form a yoke whose ends are connected by a cross bar, 15, having laterally projecting round portions adapted for lodgment in the upwardly open sockets, 16, formed in the brackets, 17, which are attached to the cross member, 12, of each sub-frame, 2. The brackets, 17, also serve to journal a rock shaft, 18, which carries the lock member, 19, with its spaced locking arms, 20. At the rear end of the trailer these locking arms, 20, extend upwardly as shown in Figure 4, embracing the sides of the locking block, 21, which is secured to the cross member, 10, of the main frame.

When this end of the vehicle becomes the leading end, the locking arms, 20, are swung downwardly by means of the handle, 22, whose hub, 23, is slidably keyed to the rock shaft, 18. A spring, 24, reacting between the hub, 23, and the washer, 25, yieldingly retains the lug, 26, on the hub, 23, in engagement with the fixed detent lug, 27, formed on the adjacent bracket, 17. It is therefore necessary to shift the handle, 22, along the shaft, 18, to free it from the lug, 27. Since this end of the vehicle is to become the leading end, the draw bar, having been removed from the other end of the trailer, is placed in position with the ends of the cross rod, 15, in the sockets, 16. As the shaft, 18, is rocked through substantially 90 degrees to relieve the locking block, 21, from the arms, 20, said arms swing downwardly against the middle portion, 15ª, of the cross rod, 15, thus holding the rod in the sockets, 16; and in this position the parts are held by engagement of the swinging lug, 26, on the hub, 23, against the opposite side of the fixed lug, 27, as indicated in dotted lines in Figure 5.

Thus it will be evident that when the rock shaft, 18, is swung back to release the draw bar from one end of the trailer, the lugs, 20, will be swung upward to engage the locking block, 21, and there will be no reason for not leaving them in that position while the draw bar remains out of the sockets, 16. In fact it is practically impossible to release the cross rod, 15, from the sockets, 16, unless the sub-frame, 2, stands at central straight-ahead position with its cross member, 12, substantially aligned with the end member, 10, of the main frame, because since the end member, 10, is straight and the rock shaft, 18, is journaled close to the face of the cross bar, 12, the lugs, 20, will strike the under side of the member, 10, if the sub-frame is turned away from its straight-ahead position; one of the lugs, 20, will be thus arrested by the frame member, 10, or the other lug will be blocked against upward swing by the overhanging block, 21, if the angle of mis-alignment is small.

Preferably for convenience in shunting the trailer about without positively coupling the tractor vehicle to it, the fitting, 21, is formed with a socket, 30, to which a push bar may be applied when desired.

I claim:—

1. In a vehicle comprising a main frame and a sub-frame swivelly attached thereto with an axle secured to the sub-frame, a draw bar provided with laterally projecting pintles, a pair of laterally spaced and upwardly open sockets on the sub-frame to receive the pintles to form a hinged connection with the draw bar, a horizontal rock shaft adjacent said sockets with locking arms fixed to said rock shaft adapted to be swung over a portion of the draw bar for retaining the latter in the sockets, and fixed abutment means on the main frame spaced to engage with said arms of the rock shaft when the arms are swung upwardly to release the draw bar.

2. In the combination defined in claim 1, a handle secured to the rock shaft for swinging the locking arms and yielding detent means for retaining said arms at either limit of their swinging movement.

3. In the combination defined in claim 1, one of said locking arms being shifted under the main frame and the other arm under the abutment means by swiveling of the sub-frame, and said locking arms being thus blocked against upward swing, whereby release of the draw bar may be effected only with the sub-frame and axle in central straight-ahead position.

4. In a vehicle comprising a main frame and a sub-frame swivelly attached thereto with the axle secured to the sub-frame, a draw bar provided with horizontal pivot means; an upwardly open socket on the sub-frame to receive such pivot to form a hinged connection with the draw bar, a horizontal rock shaft on said frame adjacent said socket with a locking arm fixed to the rock shaft adapted to be swung over a portion of the draw bar for retaining the pivot in the socket, and fixed abutment means on the main frame positioned for lateral engagement with said locking arm when the latter is swung upwardly to release the draw bar, the portion of the sub-frame which carries the rock shaft being directly below the part of the main frame which carries the abutment means, and said locking arm being positioned to be shifted under the main frame by the swiveling movement of the sub-frame, whereby it is blocked against upward swing for releasing the draw bar except when the sub-frame and axle are disposed in central straight-ahead position.

5. In a vehicle comprising a main frame and a sub-frame swivelly attached thereto, with the axle secured to the sub-frame, said frames having straight cross members whose outer faces lie in substantially the same vertical plane when the axle stands in central straight-ahead position; upwardly open socket means on said outer face of the sub-frame cross member, and a draw bar having transverse pintle means to be lodged removably therein, together with a rockable locking arm mounted on said face of the sub-frame cross member to extend horizontally from its axis over the pintle means for retaining the latter in said socket means and adapted, when swung upwardly for releasing the pintle, to engage laterally an abutment projecting from the face of the main frame cross member to hold the sub-frame and axle in central position; said cross member and said abutment serving to prevent such upward swing of the locking arm except when the parts are in straight-ahead position.

6. In combination with a vehicle comprising a frame and an axle swivelly connected thereto, a draw bar having a branched rear end forming a yoke, and a cross rod secured to said yoke with its end portions projecting laterally and its middle portion exposed between the arms of the yoke, a pair of upwardly open sockets rigidly associated with the axle and spaced apart to receive pivotally the laterally projecting parts of the cross rod, together with a locking device comprising a locking member hinged to swing upon a horizontal axis and engageable with the middle portion of the cross rod for retaining it in the sockets at one limit of its swing, and means on the frame with which said locking member engages at its other limit for holding the axle against swivelling movement.

CHARLES G. CLEMENT.